Sept. 8, 1931.  M. T. ARCHER  1,822,642
PULL ROD CLAMP
Filed Dec. 3, 1930
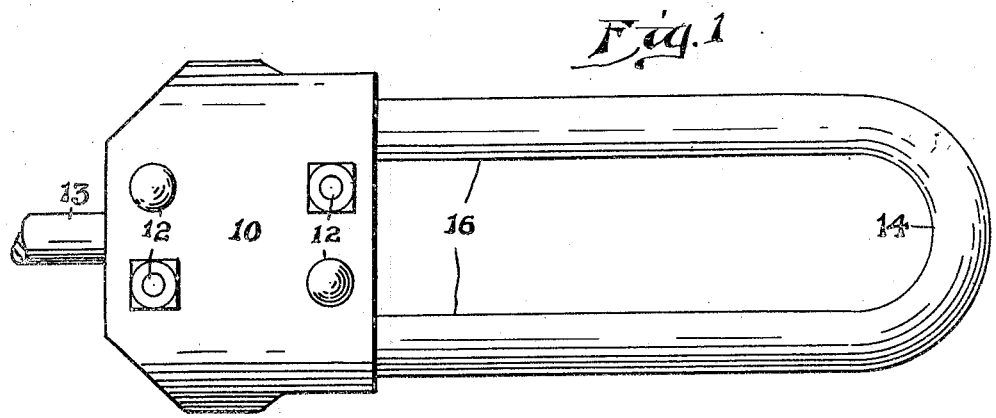
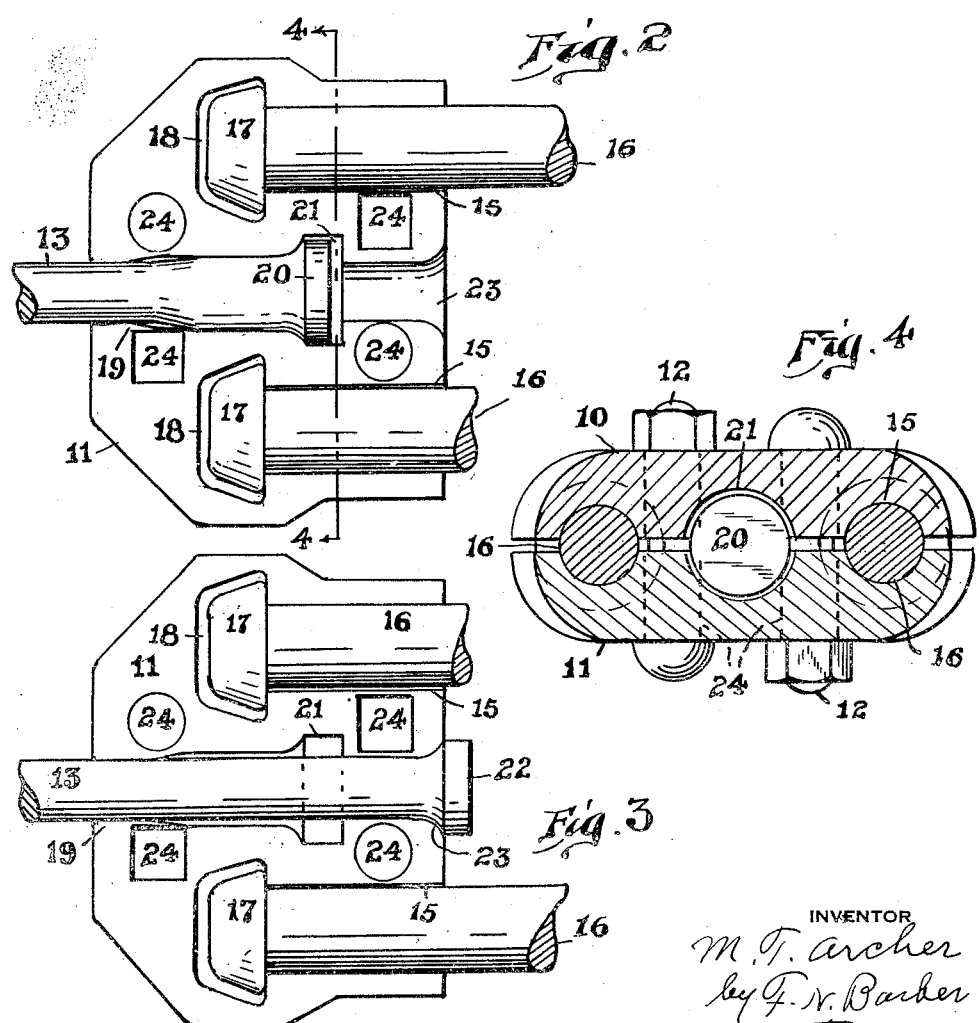
INVENTOR
M. T. Archer
by F. N. Barber
attorney Patented Sept. 8, 1931

1,822,642

UNITED STATES PATENT OFFICE

MERTON T. ARCHER, OF PITTSBURGH, PENNSYLVANIA, ASSIGNOR TO THE NATIONAL SUPPLY COMPANY, OF TOLEDO, OHIO, A CORPORATION OF OHIO

PULL ROD CLAMP

Application filed December 3, 1930. Serial No. 499,699.

My invention relates to pull rod clamps.

The object of this invention is to provide a pull rod clamp for use in the operating connection between a pumping jack and a power transmitting device, such as a pumping power, the clamp not being reversible for the substitution therein of a pull rod with an emergency head in place of one with a regular upset head or end. In case a regular upset rod should break in field service, the field operators who have usually only crude repair apparatus could head the end of the rod and replace it in the clamp without reversing the clamp end for end as is required with some types of clamps. It is the object of this invention to provide for a pull rod tandem seats in a central longitudinal opening in the clamp, the regular upset head being seated in one seat while the emergency or other head is seated in or on the other seat.

Referring to the accompanying drawings, Fig. 1 is a plan view of a pull rod clamp containing my invention, the pull rod 13 being broken off; Fig. 2, a plan view of the lower clamp member with the rod 13 and the leg 16 of the stirrup broken off; Fig. 3, a view similar to Fig. 2, but showing the head 22 of the rod 13 in the seat 23 instead of in the seat 24; and Fig. 4, a section on the line 4—4 on Fig. 2.

Referring to the accompanying drawings, 10 and 11 are duplicate clamp members positioned one upon the other and secured together by the bolts 12. The opposing faces of the members have duplicate sets of grooves and seats for the heads on the ends of the pull rod 13 and the stirrup 14. Each member has near its edges longitudinal grooves 15 which receive the outer portion of the legs 16 of the stirrup 14. The ends of these legs terminate in heads 17 seated in opposing sockets or recesses 18. The grooves 15 enter at one end of each member and terminate at the recesses 18 so that the clamp cannot be reversed end for end to permit the legs to project from either end of the clamp at the will of the operator.

The opposing faces of the members have centrally between the grooves 15 and parallel therewith, the registering grooves 19 to receive the pull rod 13 and its head 20, the latter being positioned in the registering recesses 21 at the center of the members. This head is shown to be the regular or ordinary head upset or regularly formed at the factory where it is made. In case the rod 13 fails in service, the service men in the field could provide the rod with another head such as is shown at 22 seated against the edge of the clamp or in the seat 23, this edge or seat being obviously that opposite the edge from which the rod 13 projects for connection to the service line, not shown. The clamp is designed always to have the head 20 at its center or to have the head 22 at the end of the clamp where the stirrup 14 is. 24 are holes for the bolts 12.

It is intended that the pull rod shall have its head in the recess 20 normally and in the recess 23 only temporarily until a new pull rod can be supplied or the damaged one can be properly repaired. It is advisable to have the heads 20 and 22 concealed within the clamp to avoid accidents to attendants and to prevent the rods from pulling out of the clamp.

I claim:—

1. In a pull rod clamp, a pair of clamp members having longitudinally and centrally an opening, the opening having a seat between its ends to receive a head on a pull rod, and another seat for a head differing from the first head.

2. In a pull rod clamp, a pair of clamp members having longitudinally and centrally an opening entirely therethrough, the opening having a seat between its ends to receive a head on a pull rod, and another seat for a head differing from the first head.

3. In a pull rod clamp, a pair of clamp members having longitudinally and centrally an opening entirely therethrough, the opening having a seat between its ends to receive a head on a pull rod, and the edge of the clamp at one end of the opening serving as a seat for a head differing from the first head.

4. In a pull rod clamp, a pair of clamp members having longitudinally and centrally an opening, the opening having tandem seats for pull rod heads having different characteristics.

5. In a pull rod clamp, a pair of clamp members having in its opposing faces recesses to receive the headed ends of a U-shaped stirrup and having also in said faces opposing recesses having tandem seats to receive selectively one or the other of different kinds of heads.

6. In a pull rod clamp, clamp members having in their opposing faces and near the opposite edges registering grooves terminating in registering recesses and having in their opposing faces registering grooves parallel with the first grooves and lying between the same and having registering recesses between their ends, in combination with a U-shaped stirrup having its terminals headed and seated in the first recess and its adjacent portions in the first grooves, and a pull rod seated in the second grooves and having a head seated in the second recesses, the ends of the clamp nearest the stirrup forming a rest for a head on the pull rod.

In testimony whereof, I hereunto affix my signature.

MERTON T. ARCHER.